United States Patent [19]

Baum et al.

[11] Patent Number: 5,161,156
[45] Date of Patent: Nov. 3, 1992

[54] MULTIPROCESSING PACKET SWITCHING CONNECTION SYSTEM HAVING PROVISION FOR ERROR CORRECTION AND RECOVERY

[75] Inventors: Richard I. Baum; Charles H. Brotman; James W. Rymarczyk, all of Poughkeepsie, N.Y.

[73] Assignee: International Business Machines Corporation, Armonk, N.Y.

[21] Appl. No.: 474,440

[22] Filed: Feb. 2, 1990

[51] Int. Cl.[5] ............................ G06F 11/10; H04J 3/26
[52] U.S. Cl. ............................................ 371/7; 370/60; 371/37.1
[58] Field of Search ........................ 371/37.1, 7, 11.3; 370/60

[56] References Cited

U.S. PATENT DOCUMENTS

| | | | |
|---|---|---|---|
| 4,306,286 | 12/1981 | Cocke et al. | 364/200 |
| 4,344,134 | 8/1982 | Barnes | 364/200 |
| 4,660,201 | 4/1987 | Nakamura | 371/61 |
| 4,723,244 | 2/1988 | Iacoponi | 371/37.1 |
| 4,811,210 | 3/1989 | McAulay et al. | 364/200 |
| 4,875,206 | 10/1989 | Nichols et al. | 370/85.15 |

OTHER PUBLICATIONS

Schwartz, M., et al., "Routing Techniques Used in Computer Communication Networks", *IEEE Trans. on Communications*, vol. COM-28, No. 4, Apr. 1980, pp. 539-552.

Wecker, S., "DNA: The Digital Network Architecture", *IEEE Trans. on Communications*, vol. COM-28, No. 4, Apr. 1980, pp. 510-526.

Lilienkamp, J. et al., "A Fault Tolerant Interconnection Network Using Error Correcting Codes", *Proc. 1982 Int'l. Conf. on Parallel Processing*, pp. 123-125.

Sakata, S. et al., "A Distributed Interoffice Mail System", *Computer*, Oct. 1985, pp. 106-116.

Tanenbaum, A., *Computer Networks*, ©1988 Prentice-Hall, pp. 546-558.

King, S., "E-Mail Arrives", *PC Tech Journal*, Apr. 1988, pp. 107-121.

IBM Technical Disclosure Bulletin, vol. 27, No. 5, Oct. 1984, pp. 2811-2816, entitled "Omega-Crossbar Network" by G. F. Pfister.

IBM Technical Disclosure Bulletin, vol. 28, No. 1, Jun. 1985, pp. 417-418, entitled "Organizational Redundancy For A Parallel Processor Machine" by W.C. Brantley, et al.

(List continued on next page.)

*Primary Examiner*—Stephen M. Baker
*Attorney, Agent, or Firm*—Richard M. Ludwin; Bernard M. Goldman

[57] ABSTRACT

A large number of processing elements (e.g. 4096) are interconnected by means of a high bandwidth switch. Each processing element includes one or more general purpose microprocessors, a local memory and a DMA controller that sends and receives messages through the switch without requiring processor intervention. The switch that connects the processing elements is hierarchical and comprises a network of clusters. Sixty-four processing elements can be combined to form a cluster and sixty four clusters can be linked by way of a Banyan network. Messages are routed through the switch in the form of packets which include a command field, a sequence number, a destination address, a source address, a data field (which can include subcommands), and an error correction code. Error correction is performed at the processing elements. If a packet is routed to a non-present or non-functional processor, the switch reverses the source and destination field and returns the packet to the sender with an error flag. If the packet is misrouted to a functional processing element, the processing element corrects the error and retransmits the packet through the switch over a different path. In one embodiment, each processing element can be provided with a hardware accelerator for database functions. In this embodiment, the multiprocessor of the present invention can be employed as a coprocessor to a 370 host and used to perform database functions.

11 Claims, 14 Drawing Sheets

OTHER PUBLICATIONS

Proceedings of the 1985 International Conference on Parallel Processing, Aug., 1985, pp. 764–771, Entitled "The IBM Research . . . and Architecture", by G. F. Pfister et al.

IEEE Computer, May 1987, pp. 43–56, entitled "Programming for Parallelism" by Alan H. Karp.

IEEE Computer, Jun. 1987, pp. 9–12, entitled "Interconnection Networks for Parallel and Distributed Processing" by Laxmi N. Bhuyan.

IEEE Computer, Oct. 1987, pp. 11–21, entitled "Parallel Querying of Large Data bases: A Case Study", by H. S. Stone.

IEEE Computer, Nov. 1988, pp. 26–37, "Reducing Contention In Shared-Memory Multi-Processors" by P. Stenstrom.

OMEGA NETWORK 202

FIG. 11   PACKET FORMAT

| CMD | SEQ | DST | SRC | DATA | ECC |
|-----|-----|-----|-----|------|-----|
| 5 | 8 | 15 | 15 | 128 | 9 |

| FIELD | SIZE | MEANING |
|-------|------|---------|
| CMD | 5 | COMMAND FIELD: |

00001-MESSAGE HEADER;DATA FIELD
           HOLDS FIRST 16 BYTES OF
           MESSAGE;SEQ FIELD HOLDS
           COUNT OF MESSAGE BODY
           PACKETS THAT FOLLOW(TOTAL
           MESSAGE IS 1-256 PACKETS,
           16-4096 BYTES)
        00010-MESSAGE BODY
        00011-CONTROL FUNCTION,DATA FIELD
           PROVIDES SUBCOMMAND
        00100-GLOBAL STORAGE ACCESS,DATA
           FIELD PROVIDES OP/ADDR/DATA
        00101-PE STORAGE ACCESS,DATA FIELD
           PROVIDES OP/ADDR/DATA
        10000-GLOBAL BROADCAST TO ALL PE's
        10001-BROADCASTALL PE's ON S1
           ADDRESSED BY DST,PER MASK
           IN DATA FIELD(0-63);DATA
           FIELD (64-127)HOLDS MESSAGE

| FIELD | SIZE | MEANING |
|-------|------|---------|
| SEQ | 8 | SEQUENCE NUMBER IN MESSAGE BODY PACKETS;IN MESSAGE HEADER PACKETS, COUNT OF MESSAGE BODY PACKETS TO FOLLOW |
| DST | 15 | DESTINATION PE NUMBER |
| SRC | 15 | SOURCE PE NUMBER |
| DATA | 128 | DATA CONTENT FOR DATA PACKETS; SUBCOMMAND FOR CONTROL PACKETS; OPERATION TYPE,ADDRESS AND DATA FOR STORAGE ACCESSES |
| ECC | 9 | SEC/DED ERROR CORRECTION CODE |

180 BITS PER PACKET

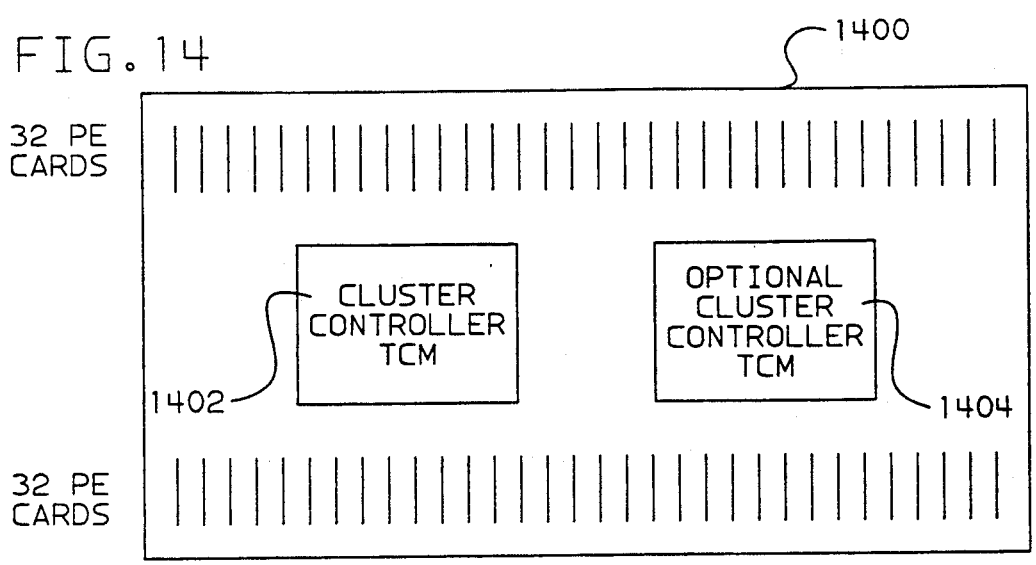
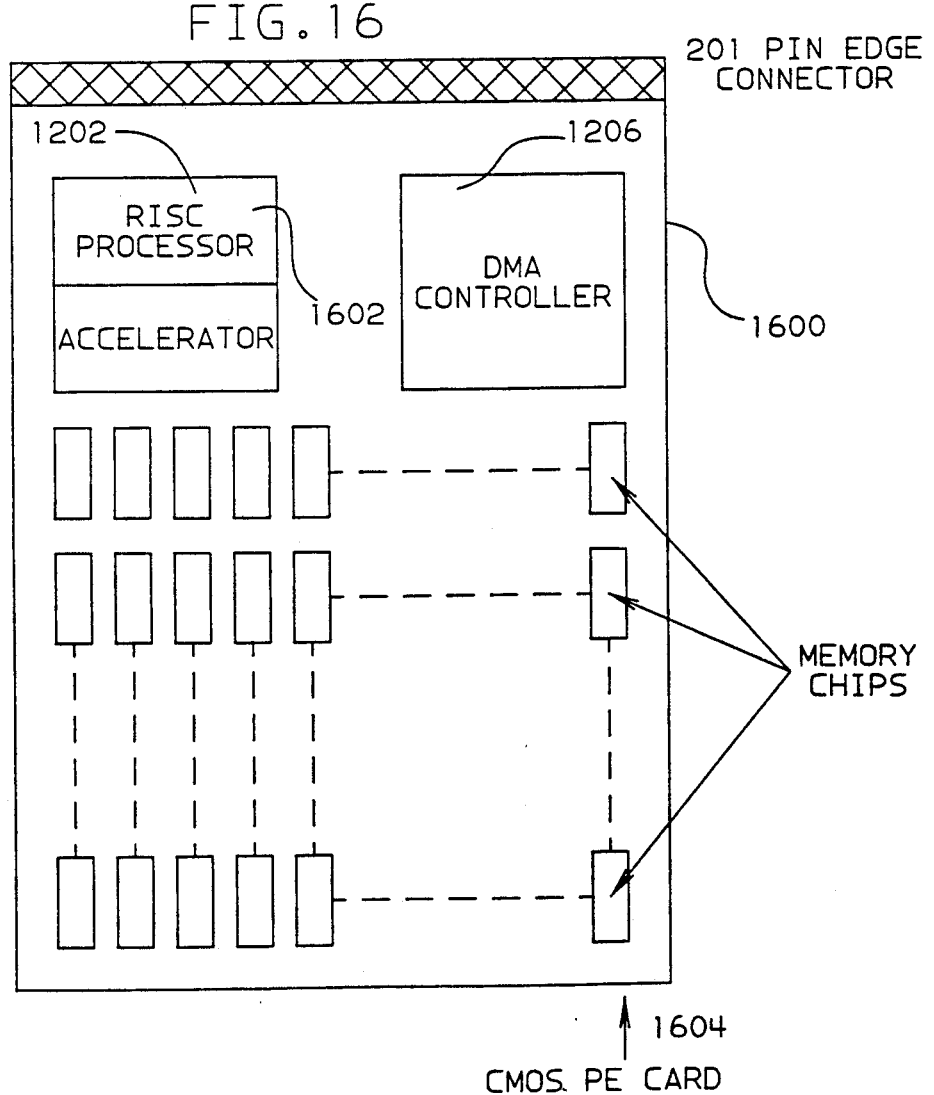

MULTIPROCESSING PACKET SWITCHING CONNECTION SYSTEM HAVING PROVISION FOR ERROR CORRECTION AND RECOVERY

BACKGROUND OF THE INVENTION a. Field of the Invention

This invention relates to the field of multiprocessing systems and error recovery in multiprocessing systems.

b. Related Art

A multiprocessing system (MPS) is a computing system employing two or more connected processing units to execute programs simultaneously. Conventionally, multiprocessing systems have been classified into a number of types based on the interconnection between the processors.

A first type of conventional multiprocessing system is the "multiprocessor" or "shared memory" system (FIG. 1). In a shared memory system, number of central processing units 102-106 are interconnected by the fact that they share a common global memory 108. Although each central processing unit may have a local cache memory, cross cache validation makes the caches transparent to the user and the system appears as if it only has a single global memory.

Shared memory systems also take the form of multiple central processing units sharing multiple global memories through a connection network. An example of such a system is an Omega network (FIG. 2). In an Omega network a plurality of switches S01-S24 organized into stages route data between a plurality of processors P0-P7 and a plurality of global memories M0-M7 by using a binary destination tag generated by a requesting processor. Each stage of switches in the network decodes a respective bit of the tag to make the network self-routing. The Omega network thereby avoids the need for a central controller.

A common characteristic of shared memory systems is that access time to a piece of data in the memory is independent of the processor making the request. A significant limitation of shared memory systems is that the aggregate bandwidth of the global memory limits the number of processors that can be effectively accommodated on the system.

A second type of commonly known multiprocessing system is the multicomputer message passing network (FIG. 3). Message passing networks are configured by interconnecting a number of processing nodes. Each node 302-308 includes a central processing unit and a local memory that is not globally accessible. In order for an application to share data among processors the programmer must explicitly code commands to move data from one node to another. In contrast to shared memory systems, the time that it takes for a processor to access data depends on its distance (in nodes) from the processor that currently has the data in its local memory.

In the message passing network configuration of FIG. 3, each node has a direct connection to every other node. Such configurations are, however, impractical for large number of processors. Solutions such as hypercube configurations have been conventionally used to limit the largest distance between processors. In any event, as the number of processors in the network increases the number of indirect connections and resulting memory access times will also tend to increase.

A third type of multiprocessing system is the hybrid machine (FIG. 4). Hybrid machines have some of the properties of shared memory systems and some of the properties of message passing networks. In the hybrid machine, a number of processors 402-406, each having a local memory, are connected by way of a connection network 408. Even though all memories are local, the operating system makes the machine look like at has a single global memory. An example of a Hybrid machine is the IBM RP3. Hybrid machines can typically provide access to remote data significantly faster than message passing networks. Even so, data layout can be critical to algorithm performance and the aggregate communications speed of the connection network is a limit to the number of processors that can be effectively accommodated.

A variant on multiprocessing system connection networks is the cluster-connected network (FIG. 5). In a cluster-connected networks, a number of clusters 502-508, each including a group of processors 510-516 and a multiplexer/controller 518, are connected through switch network 520. The cluster network has advantages over the topology of FIG. 4 in that a larger number of processors can be effectively connected to the switch network through a given number of ports. One constraint of cluster connected networks is that the bandwidths of both the cluster controller and the switch are critical to system performance. For this reason, the design of the switch and cluster controller are important factors in determining maximum system size and performance.

SUMMARY OF THE INVENTION

It is a first object of this invention to improve the performance of cluster-connected multiprocessing systems.

It is a second object of this invention to provide an efficient system for hard and soft error recovery in systems connected by way of a connection network.

It is a third object of this invention is to provide a computer system capable of performing complex ad hoc queries against a relational database at speeds which are several orders of magnitude faster than with today's largest mainframe computers.

In accordance with the above objectives there is provided an improved multiprocessing system and method.

In a first embodiment, an improved cluster controller is provided. The improved cluster controller includes a switch for distributing packets received from the processing elements in accordance with a destination address and packet priority, a global storage, queues for controlling packet flow to the processing elements, an assembly buffer for assembling data from the processing elements into packets, and selection logic for selecting packets from any of the assembly buffer and the global storage to the switching network.

In a second embodiment, a system and method for recovering from errors in the destination field of data being transferred between two nodes of a multiprocessing system having at least three nodes is provided. When data is misrouted to an improper node due to an errors in a destination address field, the error is detected and corrected. Once the error is corrected data is rerouted to the correct node by way of an independent data path (i.e. one other than the one on which it was received). Advantageously, this enables recovery from both soft and hard errors in the destination address field.

In a third embodiment a multiprocessor network is provided. The network is architected as a plurality of cluster controllers which connect groups of processors by way of a switch. The processing elements each include a local memory which is accessible by each of the processors in the system.

In a fourth embodiment, a packet format for use in a cluster connected multiprocessing system is provided. The packet format includes a data field, source and destination fields, a field that can cause a write into a global memory of a cluster controller, and error correct/detect fields.

FEATURES AND ADVANTAGES

1. The connection network design of the present system employs mainframe technology to achieve a high bandwidth system interconnection that is beyond the capabilities of many contemporary systems. High density packaging enables the use of wide buses (e.g. 180 bits), and high speed bipolar logic allows very high frequency system clocking (e.g. 5 ns). A sustained bandwidth of 200 GB/second is achievable for uniform random message transfers.
2. A DMA Controller in each processing element provides efficient transmission of messages through a novel packet protocol, which also enables the direct addressing of non-local memories. The latter capability is important for some software algorithms that assume a shared memory structure, and is also advantageous for system debugging and service functions.
3. The interleaving of packets from multiple messages by the DMA controller effectively randomizes the pattern of packet transmissions and is important to achieving maximum bandwidth through the switch.
4. The connection network design for packet switching provides efficient message broadcasting, and global storage for control functions, in addition to basic point-to-point message transmission.
5. The packet format allows robust error handling. The use of ECC together with the source (SRC) and destination (DST) identifiers in every packet permits efficient error correction or handling. If a hardware error results in the misrouting of a packet, then one of two cases exist: (1) the packet gets misrouted to a non-existent or non-operational processing element, in which case the cluster controller reverses the SRC and DST fields and returns the packet to its sender with an error flag; or (2) the packet gets misrouted to a functional processing element, which will retransmit the packet (after applying ECC as required). Retransmission can overcome soft errors and, in case 2 above, it can also circumvent some hard failures by employing a different hardware path.
6. This highly parallel processing structure, with its high bandwidth interconnection, is well suited for a wide variety of applications, some examples of which include database processing, logic simulation, and artificial intelligence.

BRIEF DESCRIPTION OF THE DRAWINGS

FIG. 11 is an illustration of the preferred packet format used in the multiprocessor system of FIG. 6.

FIG. 14 is an illustration of a processing element cluster board.

FIG. 16 is an illustration of a layout for a processing element card.

Like elements appearing in multiple figures have been assigned like reference numerals.

DESCRIPTION OF THE PREFERRED EMBODIMENTS

The present multiprocessing system comprises of a large number of processing elements which are interconnected by means of a high bandwidth switch. The hardware described in this disclosure provides up to 4096 processing elements, although the described packet architecture allows up to 32768 processing elements. It should be understood, however, that any number of processing elements could be configured using the principles described herein. The size of a system configuration can be scaled according to computational requirements, with a granularity of a single processing element (PE).

Each processing element comprises one or more high performance (e.g., 50–200 MIPS) general purpose microprocessors, a large local storage (e.g., 64–256 MB) and a DMA controller that sends and receives messages through the switch without requiring processor intervention. Each processing element can also comprise one or more optional hardware accelerators for database processing functions, Each processing element can be packed on an individual printed circuit card. The processing element cards can also provide special purpose hardware, such as I/O ports for direct access to a relational database file system, vector processing engines, or data encryption facilities. In particular, database accelerator hardware can be used to enhance the performance of common functions such as predicate evaluation, field extraction, sorting, merging, and joining.

The switch that interconnects the processing elements is hierarchical, comprising a network of clusters. Up to 64 processing elements are combined to form a cluster, and up to 64 clusters are linked by way of a Banyan network. Messages are routed through the switch in the form of packets, each of which comprise a quadword of data and a word of control information.

Figure 1:
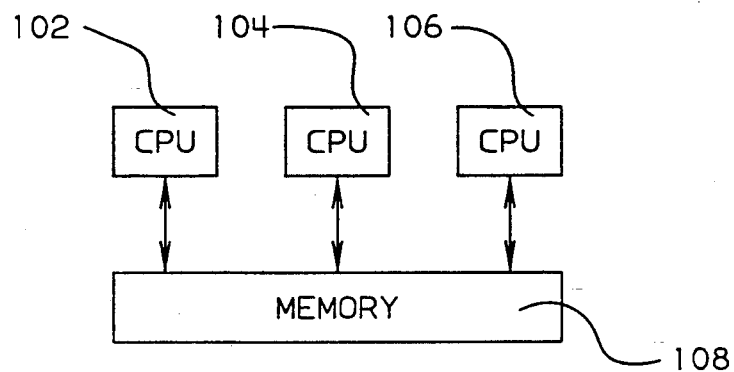
FIG. 1 is a block diagram of a prior art shared memory system.
Figure 3:
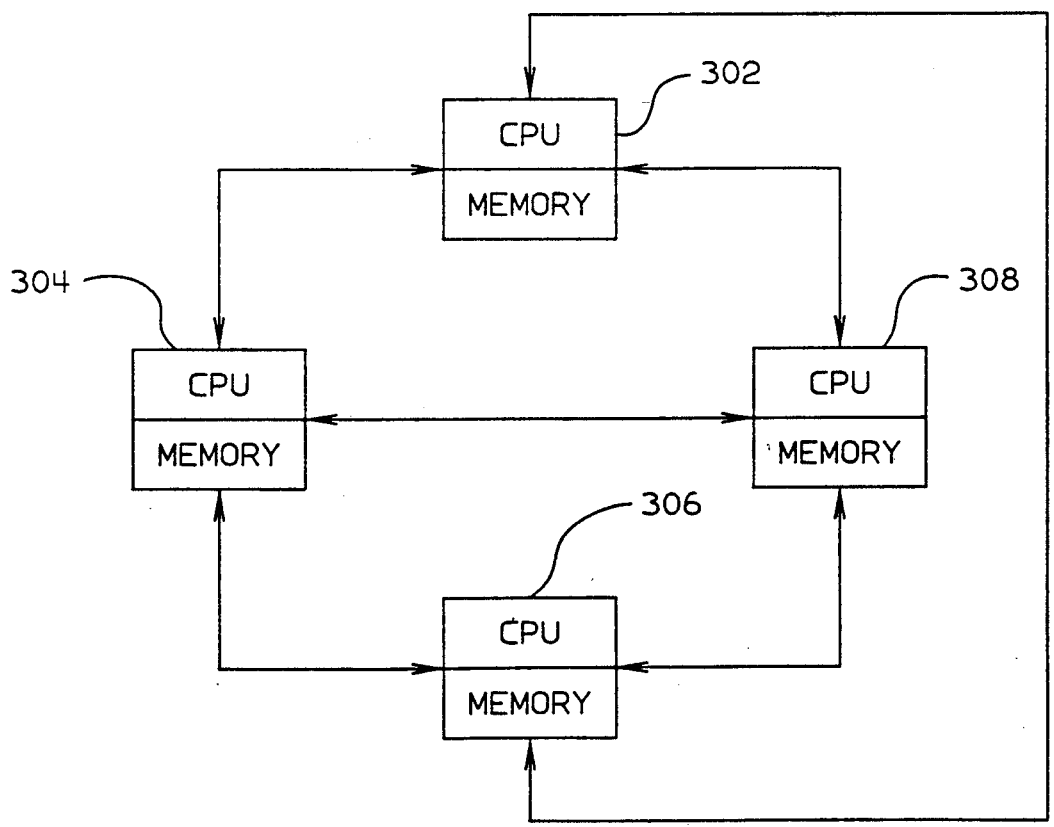
FIG. 3 is a block diagram of a prior art message passing network.
Figure 2:
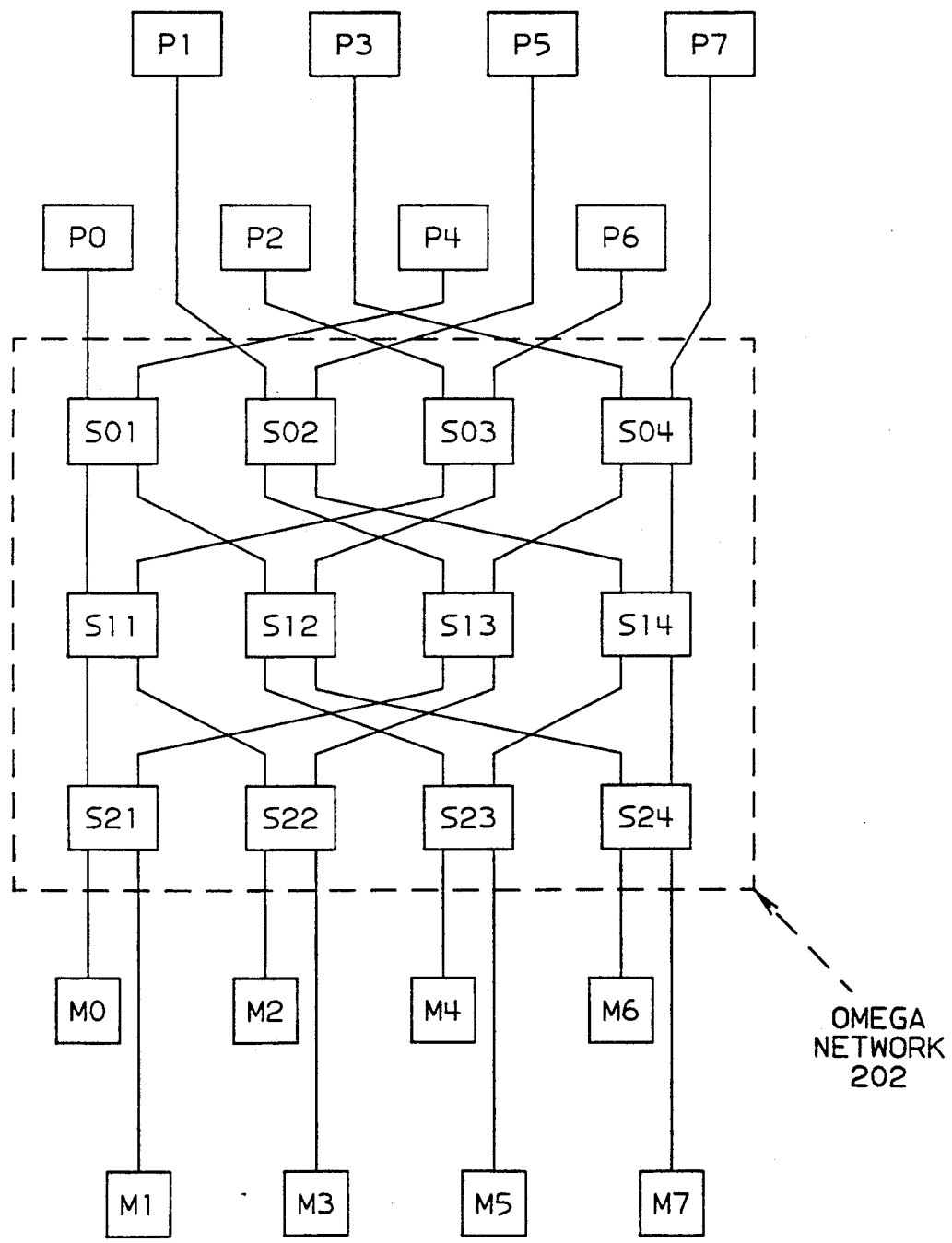
FIG. 2 is a block diagram of a prior art shared memory system configured using an Omega interconnection network.
Figure 4:
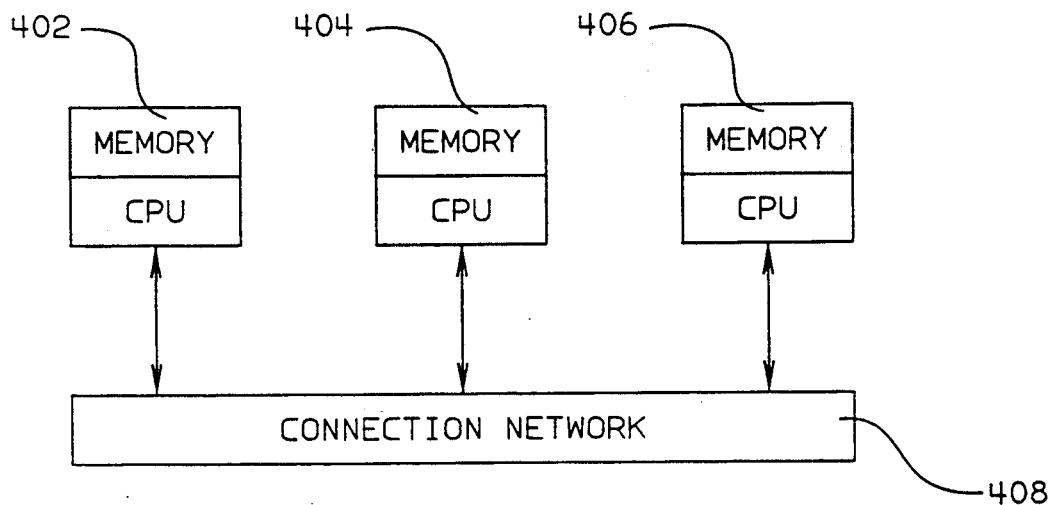
FIG. 4 is a block diagram of a prior art hybrid system.
Figure 5:
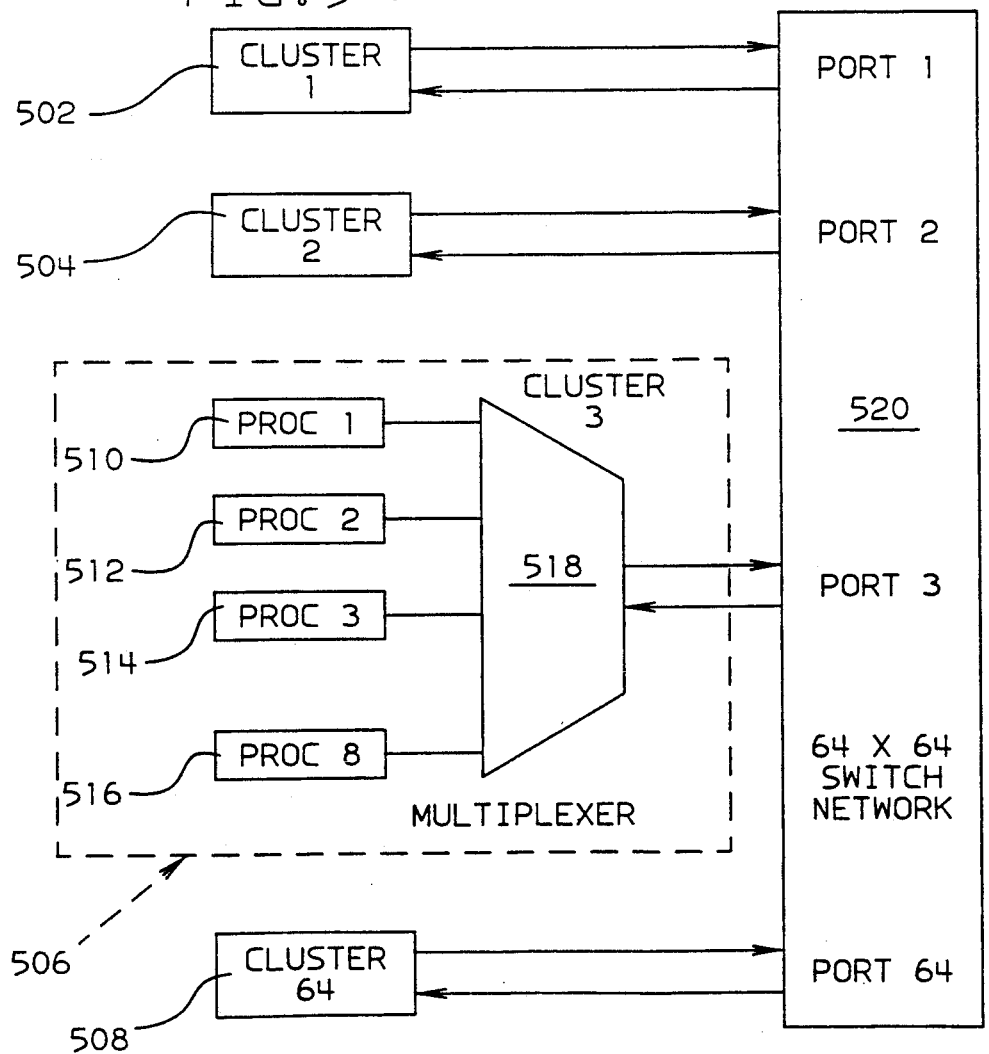
FIG. 5 is a block diagram of a prior art cluster-connected system.
Figure 6:
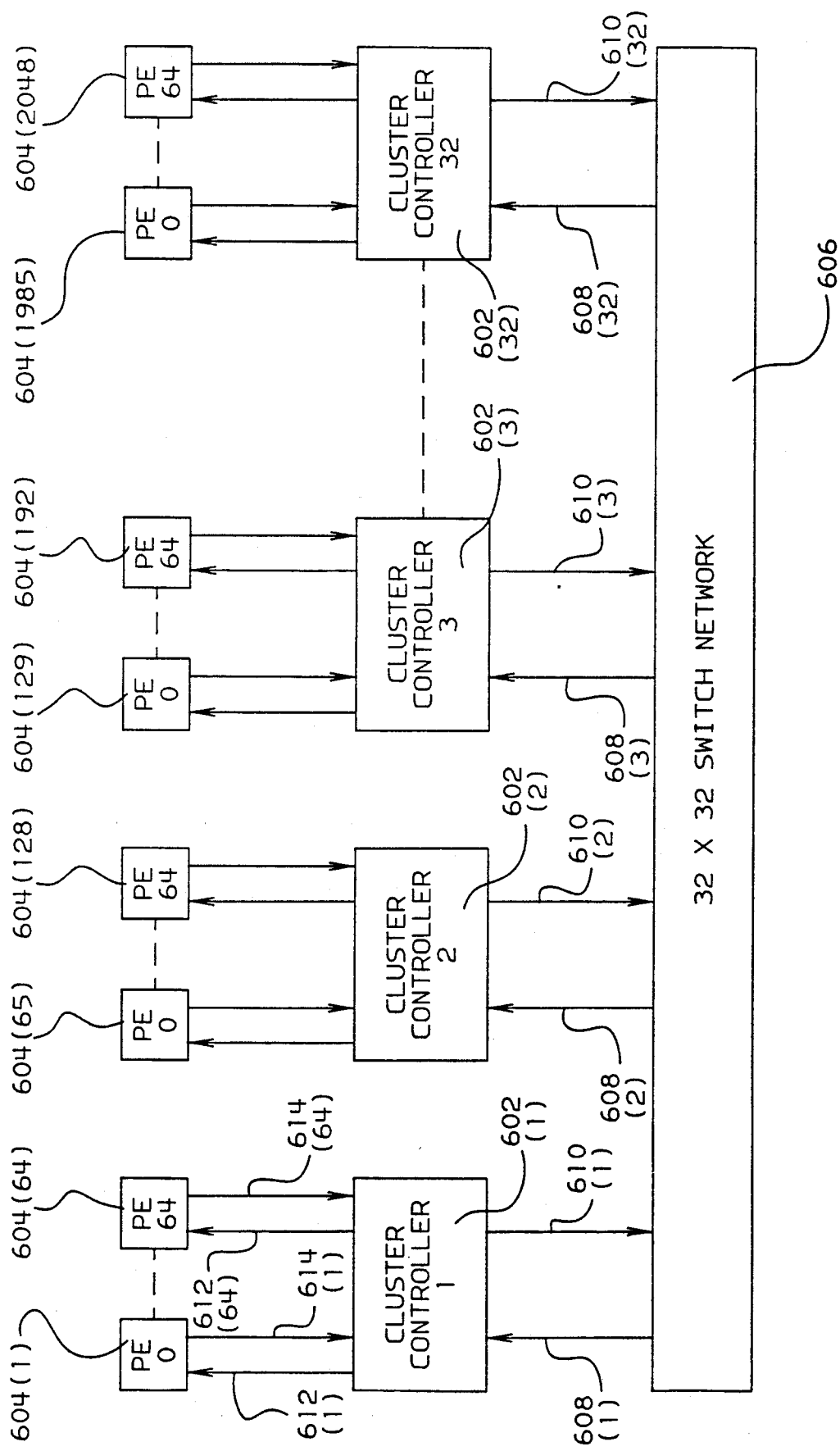
FIG. 6 is an overview of a multiprocessing system according to an embodiment of the present invention.

FIG. 6 is a structural overview of the present multi-processing system. The system of FIG. 6 is a cluster connected network (cluster network) comprising 32 cluster controllers 602(1)-602(32). Each cluster controller provides a system interface for 64 Processing Elements (PEs) 604(1-64), 604(65-128) ... 604(1985-2048). Each group of one cluster controller and 64 processing elements is referred to as a "cluster".

Each processing element in a given cluster is connected to the cluster controller by way of an input bus (e.g. 612(1)) and an independent (separate) output bus (e.g. 614(1)). Similarly, the 32 cluster controllers are each connected to a 32×32 switch network 606 by way of an input bus 608(1-32) and an independent output bus 610(1-32). The entire system thus includes 2048 processing elements 604(1-2048). Both the cluster controllers and the switch network operate to assemble and transfer data between the processing elements synchronously, under control of a high speed clock (e.g. 5 ns cycle time).

Expanded versions of the system having, for example, 64 clusters interconnected by a 64×64 switch network can be embodied in the same structure. A variety of larger and smaller configurations are equally feasible.

Where it is desired to have the cluster network of FIG. 6 act as an attached coprocessor for a host computer (e.g. an IBM 3090 series system), a port on the switch network 606 can devoted for use as a host interface. The host interface is provided by a host adapter element which takes the place of any one of the cluster controllers 602(1)-602(32) of FIG. 6.

Figure 17:
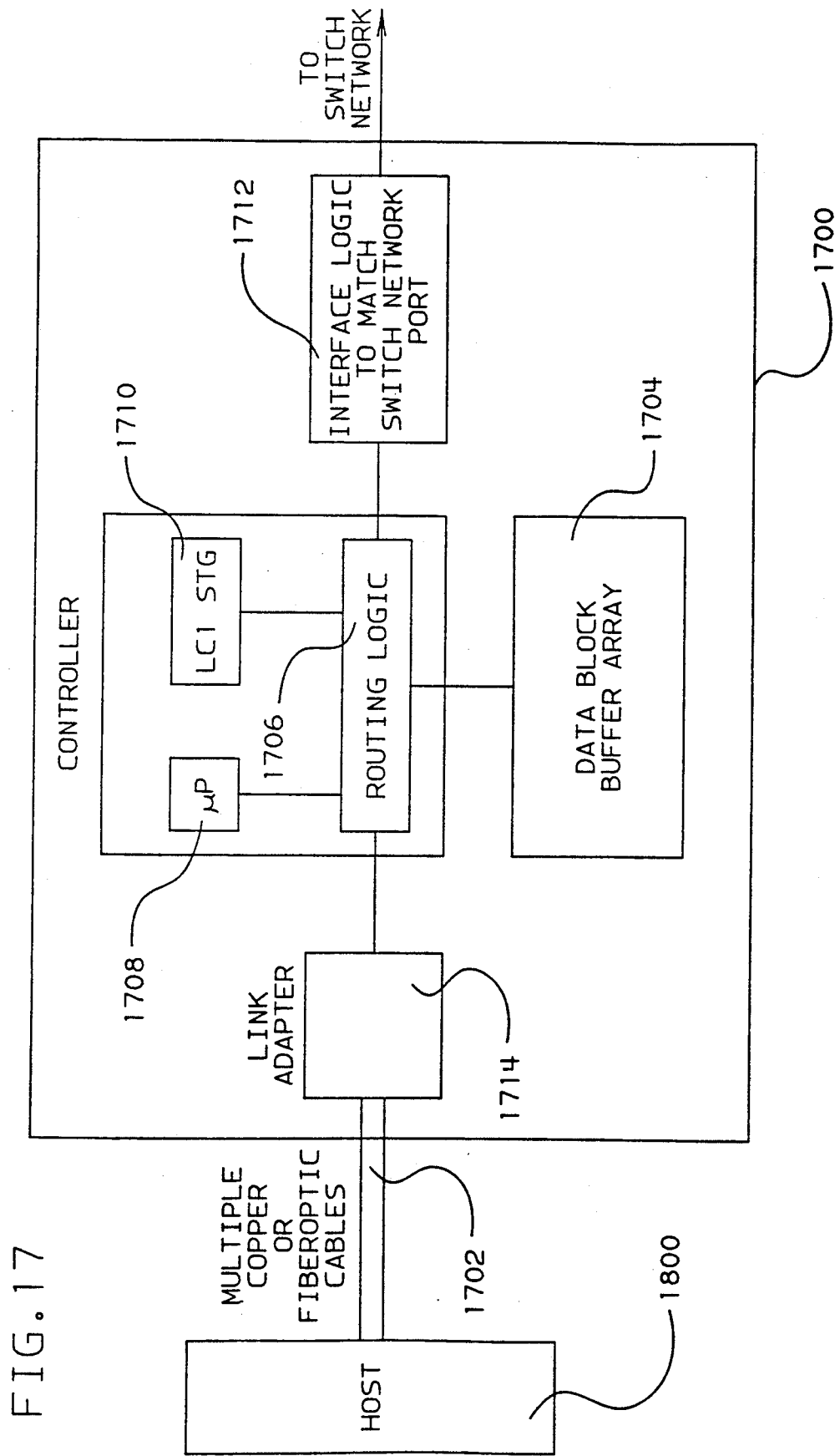
FIG. 17 is a block diagram of a host adaptor and the connection to a host system.

An embodiment of the host adaptor is illustrated in FIG. 17. The link between the host computer 1800 and the host adaptor 1700 is preferably provided by multiple fiberoptic or copper cables 1702 which connect to a high speed data link in the host computer. The link is preferably full duplex, providing for simultaneous transfers in both directions without handshaking protocols.

The host computer 1800 preferably transmits data blocks that comprise one or more data records preceded by a header record that contains control information (which includes a logical destination address and a command field) An exemplary size for each data record is 4 kilobytes. Commands from the host computer to the cluster network are accomplished as a special case of a header record without accompanying data records. The preferred architecture for the host to cluster network communication is a symmetrical peer to peer message passing scheme, which allows the cluster network to generate asynchronous responses to the host computer via commands that result in interruption on the host computer 1800.

In order to handle disparities in data transfer rates, the host adapter 1700 is provided with a data block buffer array 1704. Buffering is provided because the data rate to and from the host computer can well exceed the data rate of an individual processing element. For example, the host may have a data rate range of 500 MB/second to 1 GB/second, and a given data block could be routed to a single processing element that can only receive data at a peak rate of 200 MB/sec. Thus, the data block buffer array 1704 includes multiple buffers (preferably at least 4 KB each) for speed matching purposes. This enables the host adapter 1700 to manage several concurrent operations in order to run the host link at the maximum rate allowed by the host computer.

The host computer 1800 addresses the cluster network as a large linear address space. Via a mapping table embodied with the routing logic 1706, the host adapter 1700 converts each host address to a physical address in the memory of a processing element. Thus, the host address space of data blocks is distributed across all the processing elements as a band within their local memories. It is contemplated that as much as half the processing elements local memory space will be used for this purpose.

The mapping is managed by a microprocessor 1708 within the host adapter 1700. The microprocessor 1708 has a local storage 1710 for working data and microcode and performs the function of providing configuration control (including logical partitioning of the multiprocessor for handling multiple queries). The actual data transfers are handled by support elements, explained below, rather than by the microprocessor 1708 itself.

The interface logic 1712 performs the functions of converting data blocks, from the host, to packets for transmission to processing elements via the switch network and reverse assembly from packets. On the host side of the Host Adaptor 1700, a link adaptor 1714 converts data from the internal Host Adaptor format to the appropriate link format (e.g. fiber optic formats), and visa versa. The link adaptor 1714 also handles link level protocols. As previously explained, the routing logic 1706 decides where logical address maps to processors.

Physically, the Host Adapter 1700 is preferably embodied using a mother board that holds a number of conventional logic and memory cards using the same technologies as are used in the processing element cards. It should be understood, that the multiprocessor of FIG. 6 can operate as a stand alone multiprocessing system without the provision of a host connection.

Figure 7:
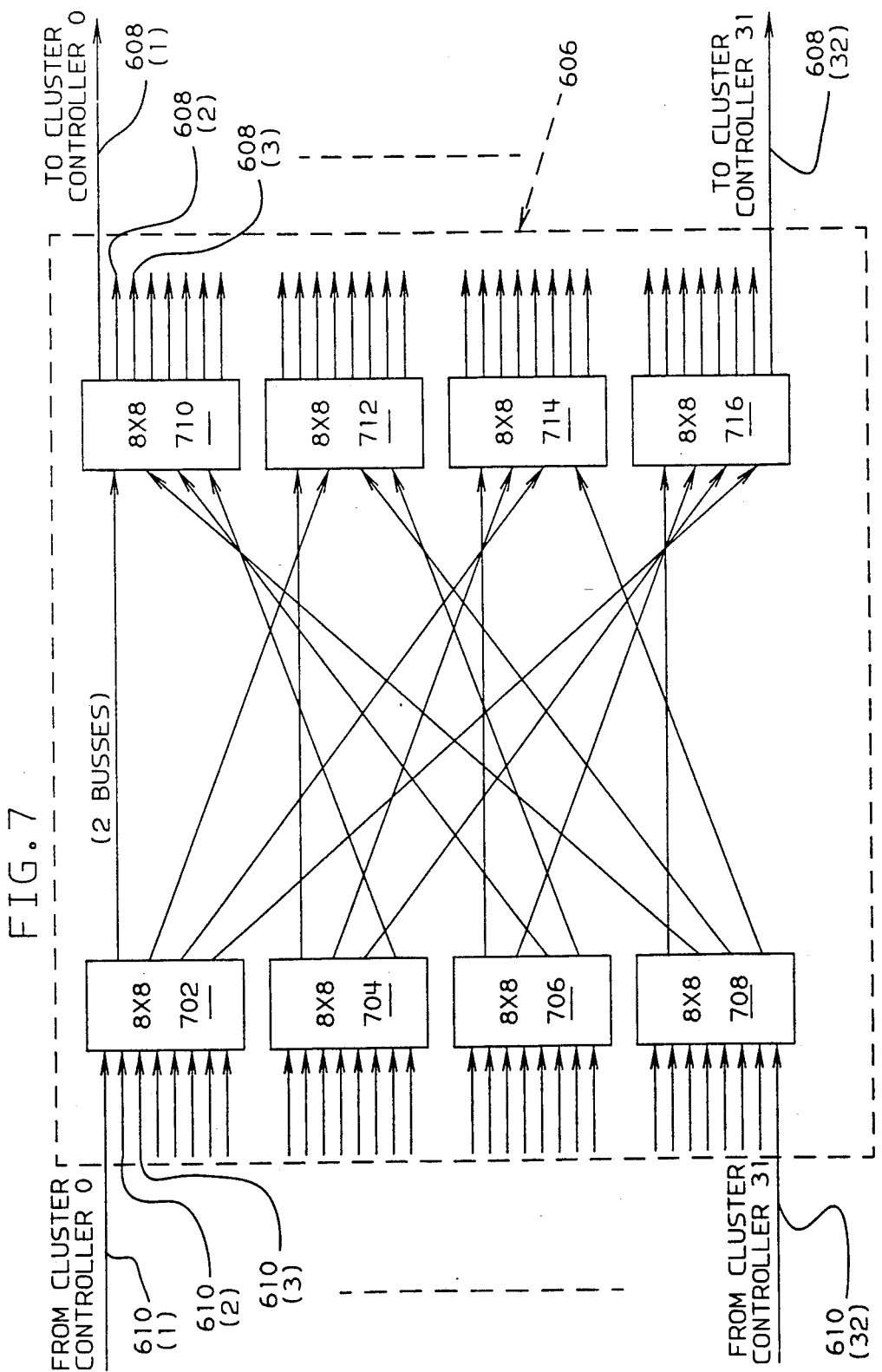
FIG. 7 is a more detailed diagram of the 32×32 switch of FIG. 6.

FIG. 7 is a more detailed illustration of the 32×32 switch network 606 of FIG. 6. The switch network 606 comprises eight interconnected 8×8 switches 702-716 each of which is preferably implemented on a thermal conduction module (TCM). A first column (stage) of switches 702-708 receives incoming packets from each of the 32 cluster controllers 602(1)-602(32). The outputs of each of the switches in the first column are connected, via pairs of output busses, to each of four 8×8 switches 710-716 arranged in a second column (stage). The second column of switches is connected to route the received data packets to the data inputs of any one of the 32 cluster controllers 602(1)-602(32).

The 8×8 switches 702-716 are of the self routing type (i.e. they decode an internal field in the incoming message to determine routing) that can provide connection between any given input port and any given output port. Further, the 8×8 switches provide simultaneous connection and communication between all eight input ports and all eight output ports in accordance with the selected routing.

A 64×64 version of the switch is used in an embodiment having 64 cluster controllers. The 64×64 switch is made by adding eight more 8×8 switches, for a total of 16 switches arranged in two columns of 8 switches each. For the 64×64 configuration, only one bus is provided between each switch in the first and second stages. Only one bus is needed because all outputs of each switch in the first column are individually connected to a switch in the second column of the 64×64 embodiment.

Figure 8:
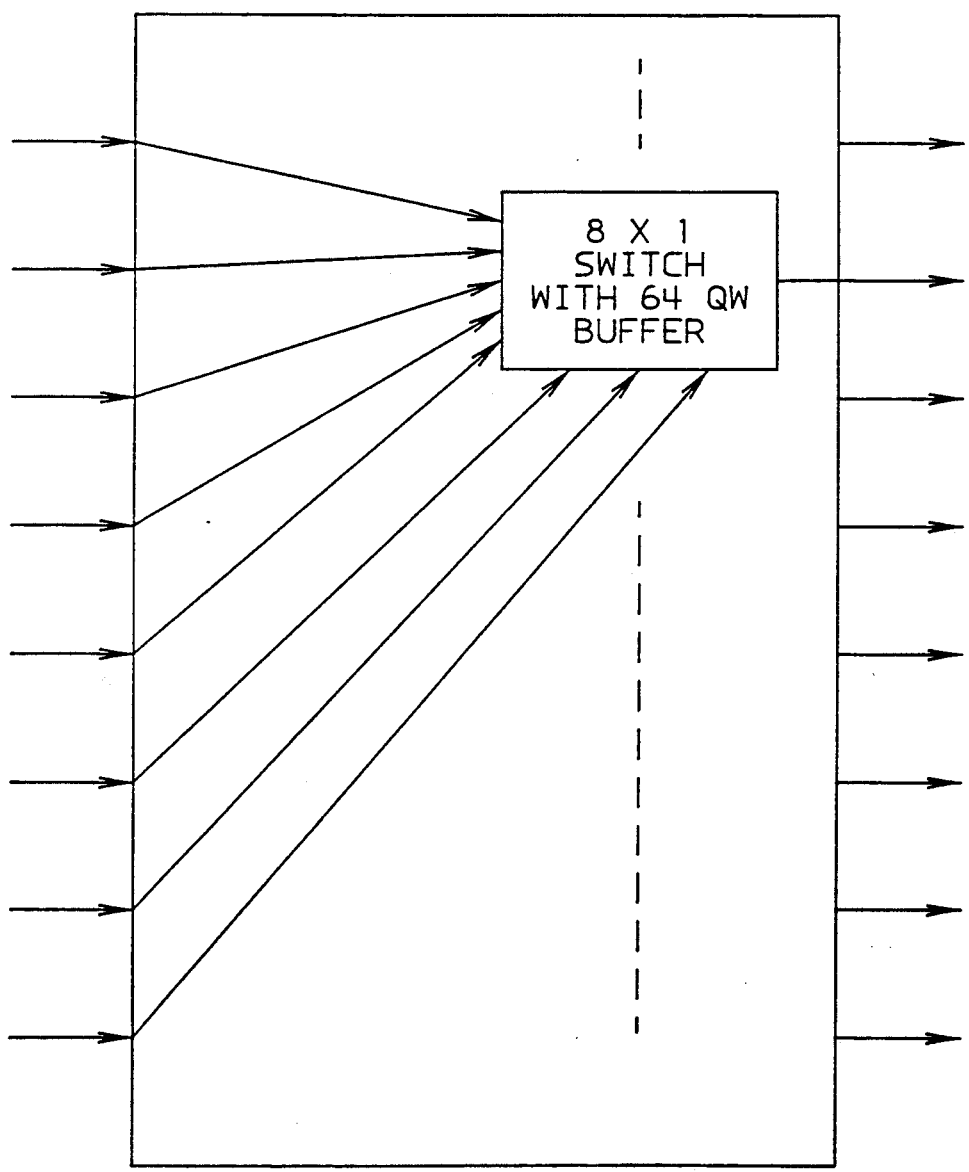
FIG. 8 is a more detailed diagram of an 8×8 switch of the type used in the embodiment of the 32×32 switch of FIG. 7.

FIG. 8 shows a typical one of the 8×8 switches 702-716. Each 8×8 switch comprises eight 8×1 switch/queues. The interconnection of a typical one of these switch/queues 802 is illustrated. Each of the input ports on each 8×8 switch/queue is bused to all eight 8×1 switch/queues. Each 8×1 switch queue can take from 0 to 8 of its inputs (quintword packets) and enter them into a single fifo output queue in each cycle of the network clock. In the same cycle a single packet (the top of queue) can be taken off the queue and passed on to the next stage of the switch network or to the final destination. If the queue is empty at the start of a cycle, a valid input packet can bypass the queue and go directly to the output, thus saving a cycle which would have been otherwise wasted in unneeded staging.

Each packet carries with it its own destination address. The addressing mechanism provides the following function. Only those packets properly addressed for the output port represented by a given switch queue will be actually be enqueued on that port. In addition, each packet will be enqueued on only one queue. The addresses must be such that an address corresponds to a unique path between a source and destination. Groups of 3 bits within each address represent the local addresses within each switch. A fixed priority scheme is used to determine in what order each of the simultaneous input packets is enqueued. Although a more sophisticated scheme could be used, since every quintword packet has the opportunity to get on the queue on every cycle, the fixed priority scheme is inherently a "fair" one (i.e., no single source will get more or less than its share of entries on the queue, unless other sources have no data for this output port.)

Figure 9:
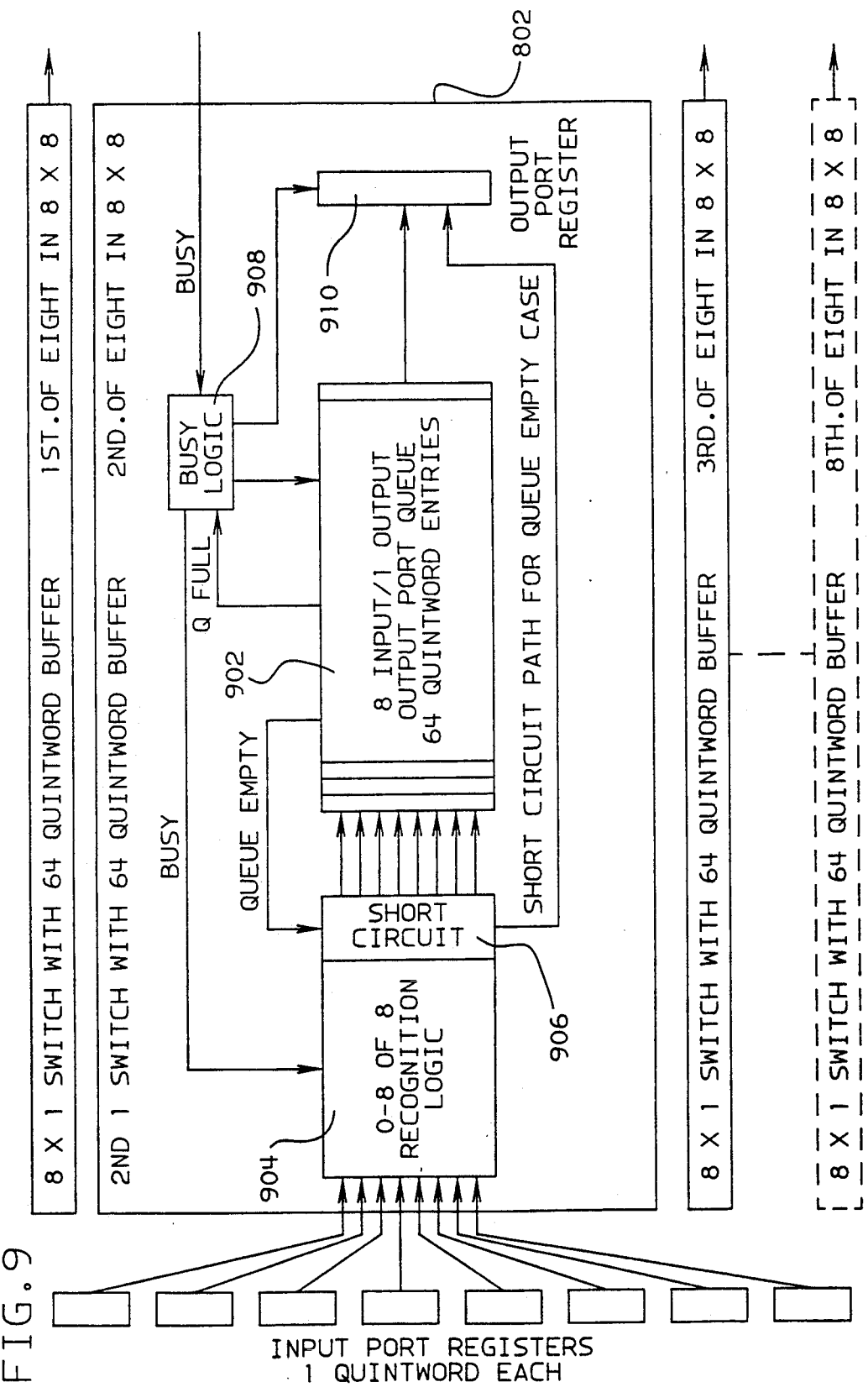
FIG. 9 is a more detailed diagram of the typical switch/queue of FIG. 8.

FIG. 9 is a more detailed diagram of the typical switch/queue 802 shown in FIG. 8. Each switch/queue contains a queue 902 of up to 64 packets. Each packet is a quintword (180 bits) in size. Each word includes 32 bits of data plus 4 bits of ECC. A packet from an input port is selected by the recognition logic 904 of a single switch/queue based on the destination address (DST id) which is contained in the control word portion of the packet. Up to eight packets (one from each input port) may be enqueued at a given output port during each cycle. Simultaneously, each output port can select a packet for transmission, either from its local queue 902, or from short circuit logic 906 which enables a single input to go directly to the output port register 910 when the queue is empty. Busy logic 908 is provided to prevent forwarding a packet when a downstream queue is full. This design prevents an output from appearing to be busy during bursts of activity, and can thereby avoid propagating the busy condition to senders.

As an example of operation, let us assume that three of the eight inputs to the 8×8 switch have valid addresses which direct them to the second output port. The recognition logic 904 will select on those three addresses to be gated to this part of the switch. If the output port queue 902 is not empty and is not full, the input packets will be enqueued. If the output port queue 902 is full, the Busy Logic 908 will prevent the ingating of the packets. If the output port queue 902 is empty, the Short Circuit Logic 906 will take one of the three input packets, in accord with a conventional priority scheme, and pass it directly to the output port register 910, at the same time enqueueing the remaining two packets on the output port queue. The packet in the Output Port Register 910 will be gated to the next level of the switch as long as that level is not busy.

Figure 10:
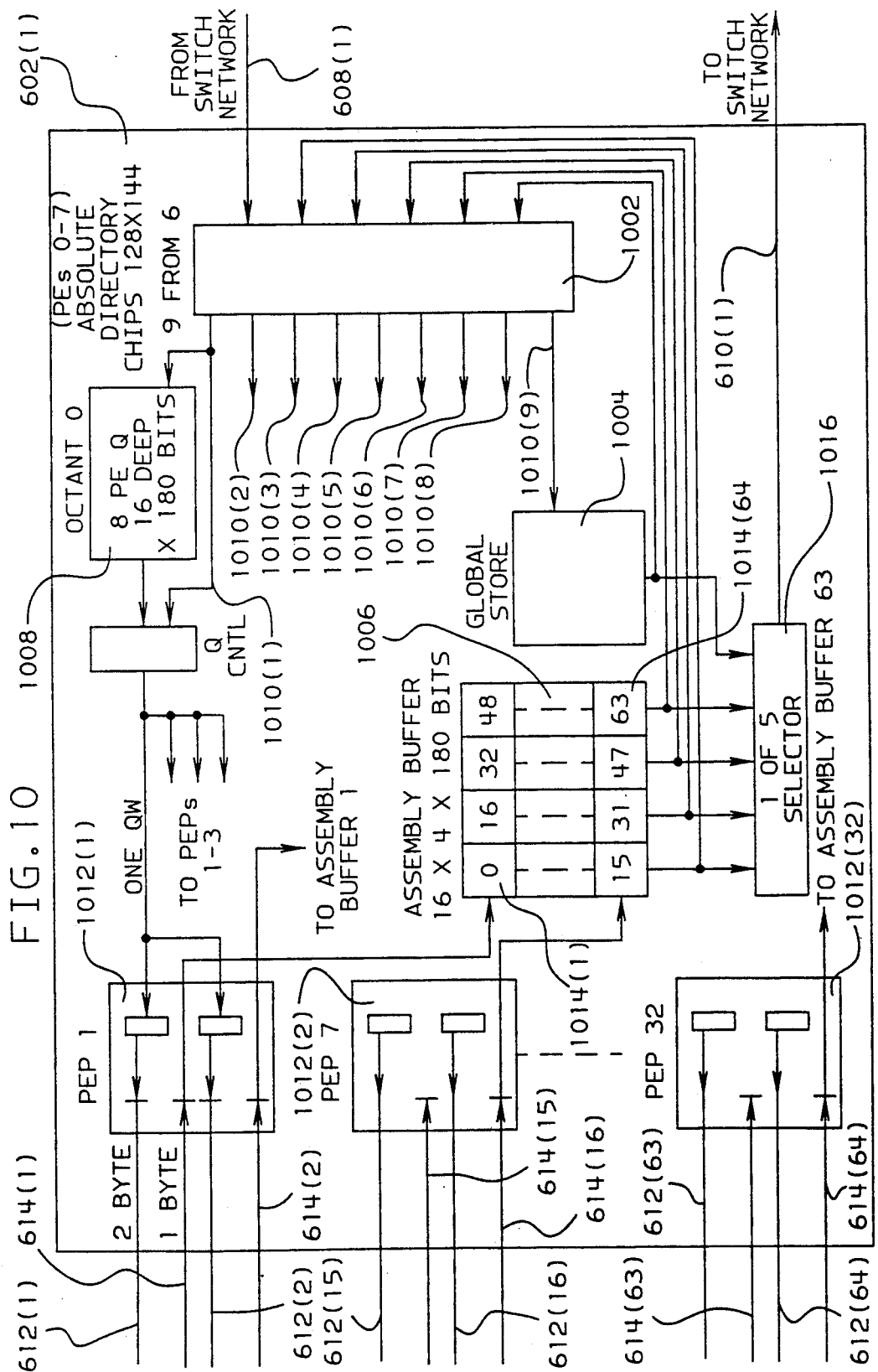
FIG. 10 is a more detailed diagram of a cluster controller of the type used in the embodiment of the multiprocessing system of FIG. 6.

FIG. 10 is a more detailed illustration of an exemplary one of the cluster controllers 602(1)-602(32) of FIG. 6. Cluster controller 1 602(1) will be used by way of example. Coming from the second stage of the switch network (switches 710-716), data received on the input bus 608(1) is routed to a 9 from 6 switch 1002. The 9 from 6 switch 1002 receives six inputs: one from the switching network 606, one from a global store 1004 and four from a cluster controller assembly buffer 1006. The 9 from 6 switch 1002 distributes the received data (from the six inputs) to the appropriate "octant" or to the global store 1004. The global store 1004 can be used for a variety of functions including sharing status between processing elements, process coordination, shared algorithm control, and shared data.

In order to route the received data to the appropriate octants the 9 from 6 switch 1002 decodes 3 bits from the internal packet destination address (DST). Alternatively, the global store 1004 is accessed by the switch 1002 decoding a global store access command. Any conflicts for output from the 9 from 6 switch 1002 are resolved with a conventional priority and round robin scheme. The connection from the switching network 608(1) always has highest priority.

Of the 9 outputs 1010(1-9) of the 9 from 6 switch 1002, eight are connected to octants of processing element queues. An exemplary octant is designated by reference numeral 1008. Each of eight outputs 1010(1)-1010(8) are connected to an individual octant of this type. Each octant includes eight processing element queues. Each queue is 16 packets deep and includes busy/full logic and short circuits for empty queues. Each octant has only one input (from the 9-from-6 switch) and one output, and enables one read and one write to occur simultaneously.

Each cluster controller 602(1)-602(32) further includes 32 Processing Element Ports (PEPs) 1012(1)-1012(32). Each processing element port includes subports to interface with two processing elements. Each subport includes a two byte output port connected to a corresponding one of the processing element input busses 612(1-64) and a one byte input port connected to the corresponding one of the processing element output busses 614(1-64) for each of two processing elements. The output of each queue is bused to all four PEPs (for eight processing elements) in the octant. The PEPs use address decoding to ingate only those packets which are addressed to the appropriate processing element. Each PEP includes a packet buffer for the output port with logic to signal to the octant queues when the buffer is empty.

Each of the eight octants operates independently, serving one of its eight PEP buffers one quintword each cycle, if a packet is available. From the PEPs, the packet is sent across the appropriate processing element input bus to the addressed processing element, two bytes at a time. The asymmetry of the input and output buses (one versus two bytes) helps to prevent queue full conditions.

In the inward direction (i.e. from the processing elements), one byte of data comes across one the input buses from a processing element into the corresponding processing element port (i.e. the PEP to which the PE is connected). From the processing element port, the incoming byte of data is routed directly into a port of an assembly buffer 1006 which takes in successive bytes and forms a quintword packet. The assembly buffer has 64 slots (quintword memory locations) 1014(1)–1014(64). In other words, there is one slot in the assembly buffer for each processing element, each operating independently an having its own byte counting and busy logic (not shown).

The assembly buffer slots are arranged into four columns. Each column has its own round robin logic to select one slot of those which are complete. Each cycle of the network clock, one quintword packet from one slot in each column can be outgated. The outgated packets go to the 9-from-6 switch 1002 and the 1-of-5 selector 1016. A fifth input to the 1 of 5 selector 1016 comes from the global store 1004. The 1-of-5 selector will, based on address and round robin logic, takes one packet which needs to be routed through the switch network 606 and send it on its way. Packets which are not successfully gated through either the 1-of-5 selector or the 9-of-6 switch remain in their slots to be selected the next time the round robin algorithm allows.

An example of the operation of the cluster controller, under a uniform distribution of messages, is as follows:

One input from the connected processing elements, a byte per cycle, is read into each of the assembly buffers. Five quintword packets per cycle can be outgated to the 1-of-5 selector, so that one quintword per cycle is sent to another cluster controller.

On the output to PE direction, up to 6 quintword packets can be gated to up to 9 destinations, with queueing. Assuming a 5 ns cycle of the cluster controller, with a 10 ns cycle on the input and output to PE buses, the cluster controller can input 6.4 GB/sec from the PEs (100 MB/sec/PE). The assembly buffers and global memory can output 12.8 GB/sec, up to 3.2 GB/sec of which can to other cluster controllers. Up to 19.2 GB/sec may enter into the output queues, and the output queues themselves can dispatch up to 28.8 GB/sec to the PEPs and Global Store. The PEPs each can deliver 200 MB/sec to their respective PEs, which aggregated would allow up to 12.8 GB/sec to flow out of the cluster controller to the PEs. While these are peak numbers, they show that the design is biased to allow a steady stream of 3.2 GB/sec to flow from PEs to other clusters, and up to 12.8 GB/sec back out to the PEs. Again, the design is biased to prevent queues from filling and creating contention upstream in the switch.

Figure 12:
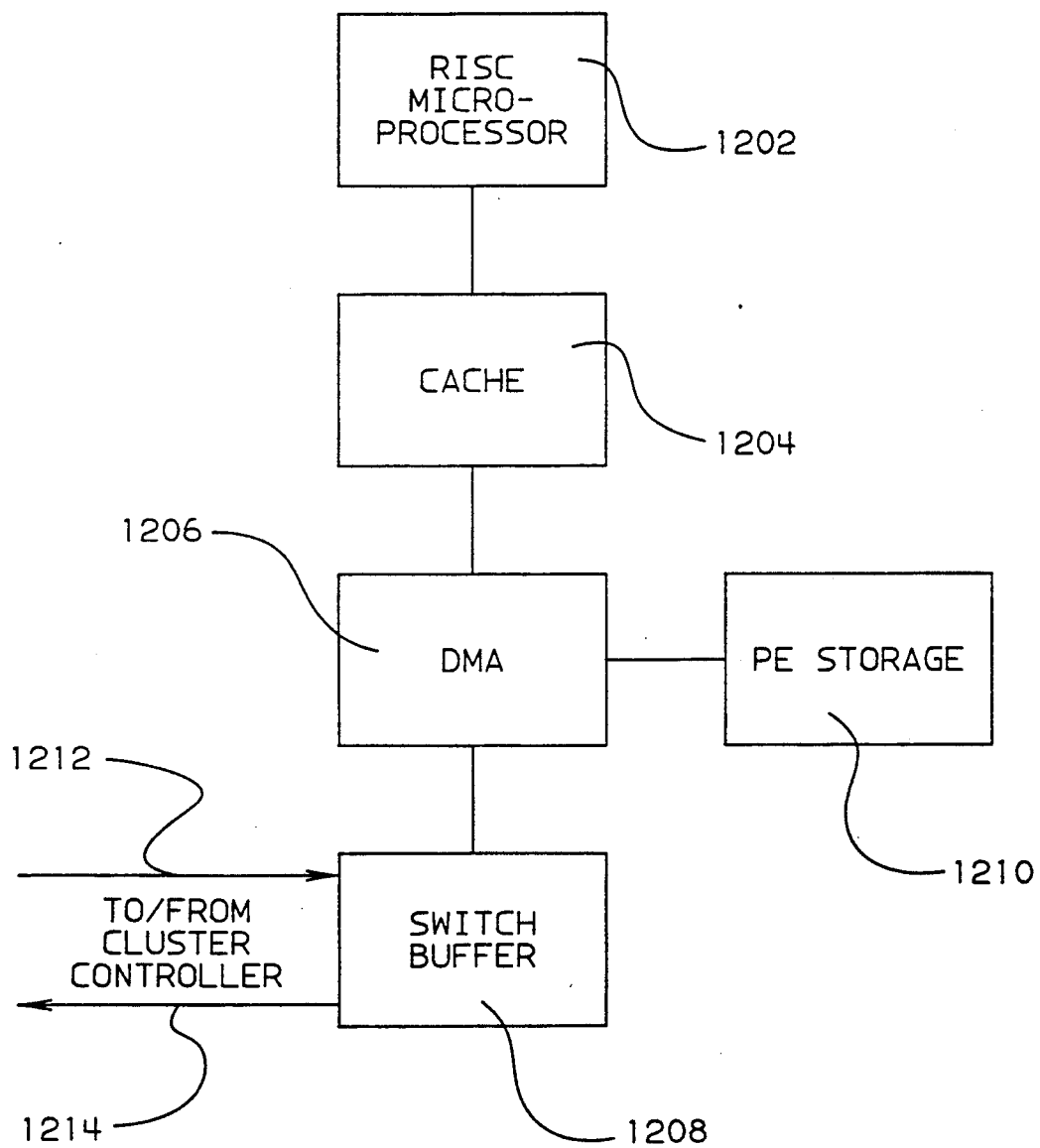
FIG. 12 is a more detailed block diagram of a typical processing element showing the interconnection between the processing element, the memory, the DMA controller and the cluster controller.

FIG. 12 shows a preferred embodiment of the processing elements 604(1)–604(2048) of FIG. 6. It should be understood that the present multiprocessor could use other types of processors as processing elements. The central processor 1202 of the processing element is preferably a state of the art RISC microprocessor. It is connected, in a conventional manner, to the processor cache 1204 which gives fast access time to instructions and data. The bus from the cache 1204 ties into a DMA controller 1206. The DMA controller 1206 provides the cache 1204 bidirectional ports to each of the switch buffer 1208 and the main processing element storage 1210. The switch buffer 1208 is an input/output buffer which handles the data and protocols to and from the cluster controller. The cluster controller connects to the processing element through the switch buffer 1208 by way of two unidirectional ports connected to individual busses 1212, 1214. The first unidirectional port handles incoming traffic from the cluster controller to the processing element while the second unidirectional port handles outgoing traffic from the processing element to the cluster controller.

Figure 13:
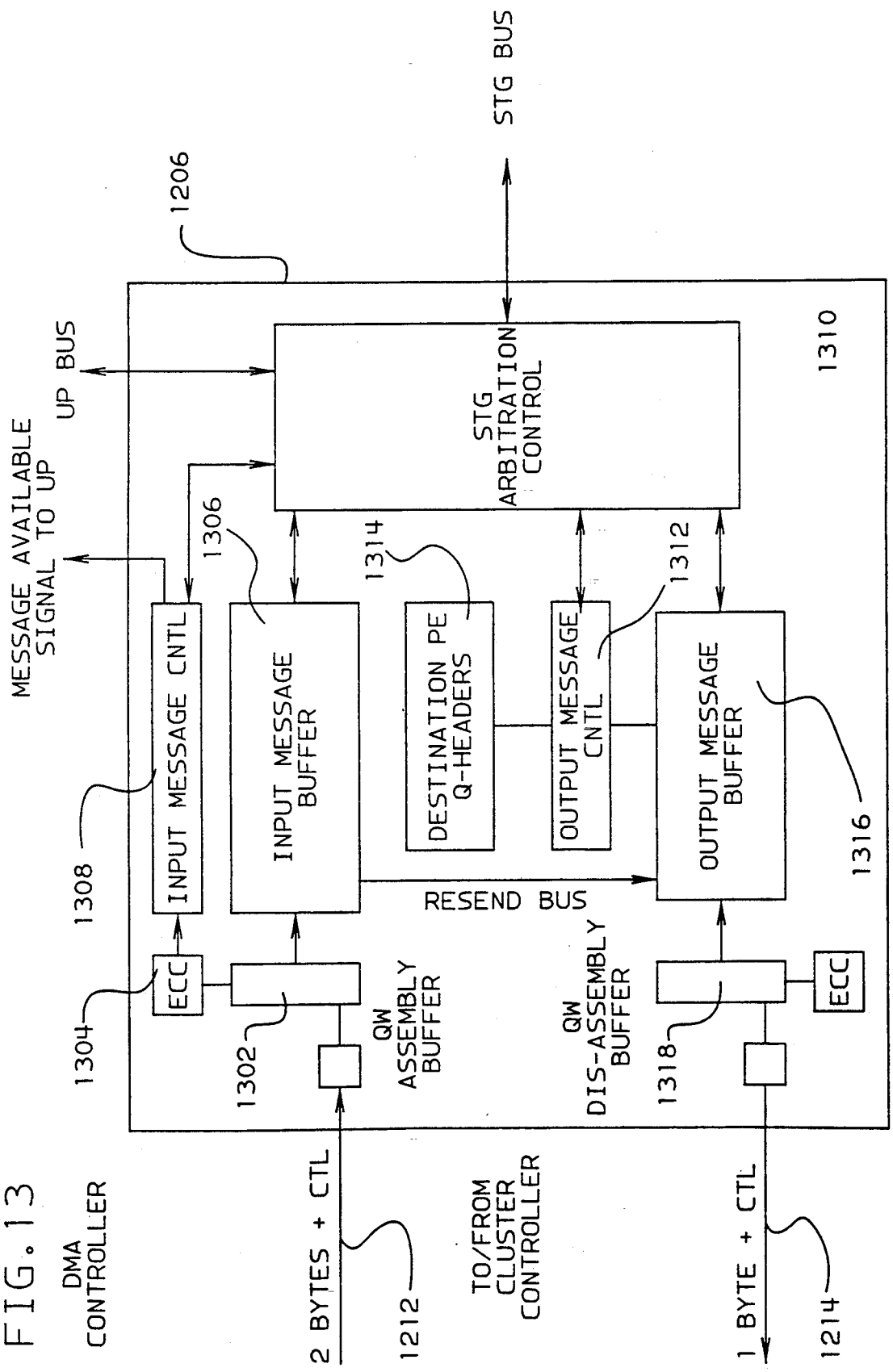
FIG. 13 is a more detailed block diagram of the DMA controller of FIG. 12 showing each of the functional blocks and their interconnections.

FIG. 13 is a more detailed diagram of the DMA controller 1206 of FIG. 12. To process incoming messages, a Quintword Assembly Buffer 1302 takes 2 bytes of data at a time from the cluster controller to processing element bus 1212 and reassembles the packet. The ECC logic 1304 checks and restores the integrity of the data as well checks whether the packet arrived at the proper destination.

Once the data integrity is verified or corrected and it is determined that the packet has arrived at its proper destination, the Input Message Control Logic 1308 places the data on a queue in the PE storage 1210. This task is accomplished by a Storage Arbitration Controller 1310, which can handle multiple requests for the PE storage 1210 and can resolve any storage conflicts. The Input Message Control Logic 1308 then signals the PE microprocessor 1202 that a message is available.

When the PE microprocessor 1202 wishes to send a message to another PE, it first enqueues the message on a destination queue in the PE storage 1210. The microprocessor 1202 then signals the Output Message Control 1312 that a message is ready. It does this by doing a "store" operation to a fixed address. This address does not exist in the PE storage 1210 but is decoded by the Storage Arbitration Control 1310 as a special signal. The data for the "store" operation points to the destination queue in PE storage 1210.

Before being sent to the cluster controller, each message in the destination queue is provided with a header. The headers are kept locally in the DMA controller 1206 in the destination PE Q-header array 1314. The message header specifies the total length of the message in bytes (up to 4096), the id of the PE to which the message is to be sent (15-bit DST id), and the id of this sending PE (15-bit SRC id).

To achieve high switch bandwidth, the DMA controller interleaves packets from multiple messages, rather than send the messages sequentially. However, all messages from one processing element to another specific processing element are sent in order. The switch design ensures that the packets received by a processing element from another specific processing element are received in the same order in which they were sent. The Output Message Control Logic pre-fetches all or portions of the top message for the various destination into the Output Message Buffer 1316. From the Output Message Buffer 1316, the data is taken, one quintword at a time into the Quintword Disassembly Buffer 1318 where it is sent, a byte at a time, across to the cluster controller.

As a further function, the DMA controller 1206 also generates a nine bit SEC/DED Error Correcting Code (ECC) for each packet prior to transmission.

The error correction function of the present system will now be described in more detail. As previously explained, as message packets arrive at a processing element, the DMA controller 1206 applies the ECC, and then performs the function specified by the packet command field. If the ECC indicates that a single bit error occurred in the DST id of the received packet, then the packet should have gone to some other processing element, so the DMA controller 1206 corrects the DST id and retransmits the packet to the correct processing element. Where the cluster network is configured with a host processor, the DMA controller 1206 also reports this error event to a host processor service subsystem. This is accomplished by generating an interruption to software on the host processor, which reports the error to the service subsystem under the control of a thresholding algorithm.

While ECC is generated in the sending processing element and applied in the receiving processing element, parity checking is also performed every time a packet enters or leaves a TCM, and upon receipt by the destination processing element. Thus, correctable errors are detected and can be reported to the service system as soon as they begin to occur.

The self correcting error handing of the present system will be better understood by reference to FIG. 6. We will assume, for example, that there is a cabling problem between cluster 602(1) and the 32×32 switch network 606, that will cause a hard error in the destination address field of an incoming packet. We will further assume that the incoming packet was intended for processing element 604(3) on cluster controller 602(1) but instead, due to the hard error, arrives as processing element 604(1) on the same cluster controller.

The receiving processing element 604(1) will receive the incoming packet by way of the 9-6 switch and a PEP output bus. Once the packet is received, the processing element will correct the destination field error (using the ECC), and resend the packet on the cluster controller 602(1) to the correct PE 604(1) by way of the PEP input bus and the assembly buffer. Since the packet will no longer travel the path of the problem connection, the hard error will not be repeated for this packet.

A similar procedure ensures correction of many errors where an incorrect destination address is caused on the bus from the cluster controllers to the switch network 606. It will be noted that each cluster has a separate input bus and output bus. Therefore, if the destination address of an outgoing packet is altered due to a misconnection on the output side of the bus and a packet is sent to the wrong cluster controller, the path between the correct cluster controller and the receiving/correcting cluster controller will completely differ from the path between the originating processor and the receiving/correcting processor.

The switch network 606 itself also includes error correction logic. Therefore, if a packet is routed to a non-present or non-operational processing element, the switch will reverse the source and destination fields and send the packet back to the sender with an error indication.

FIG. 11 shows a preferred embodiment for a packet format used with the system of FIG. 6. Each packet is 180 bits wide and includes a 5 bit command field (CMD), an 8 bit sequence number field (SEQ), a 15 bit destination address field (DST), a 15 bit source address field (SRC), a 128 bit data field and a 9 bit error correction code (ECC).

The command field (CMD) includes a five bit command that tells the cluster controller and the receiving processing element how to handle the packet. The sequence number field (SEQ) includes an 8 bit packet sequence number sequentially assigned by the originating (source) processing element. The sequence number enables the receiving system to identify which packet number of the total packet count in the message has been received.

The destination address field (DST) includes a fifteen bit destination processing element number. The destination field is used by the switch and cluster controller to self route the packet and by the receiving (destination) processing element to verify that the packet has been routed to the proper address.

The source address field (SRC) includes a fifteen bit originating (source) processing element number. The source field is used by the switch and cluster controller to return the packet to the source in a case where an inoperable or non-present processing element number appears in the destination address field (DST) field, and by the receiving (destination) processing element to properly address any response to the message or command.

The data field (DATA) includes 128 bits of information. The type of information in the data field is defined by the command field (CMD).

The ECC Field (ECC) includes an SEC/DED (Single Error Correct/Double Error Detect) error correction code.

For message header packets, the sequence field specifies the total length of the message, and the DMA controller allocates a message buffer of this length in the PE local memory, writes the initial quadword of data into the message buffer, and sets local hardware pointer, length and sequence registers if there will be more packets of data for this message. It also constructs the message header in memory, which includes the message length, DST id and SRC id.

For message body packets, the sequence number field is checked against the sequence register to verify that packets are arriving in order, and each quadword of data is added to the message buffer. When the message has been completely received it is enqueued on a queue in local memory, known as the IN_QUEUE, for processing by the local processor. If the IN_QUEUE had been empty prior to the addition of this message, then an interruption is generated to the local processor to notify it of pending work.

For storage access command packets, the DMA controller performs the required fetch or store operation to the PE local memory (transferring a doubleword of data), and for fetches a response packet is constructed by reversing the SRC and DST id fields, and then sent on the through the switch to return the requested doubleword of data.

Packets that contain global storage access commands are handled in the cluster controller in the same way that local storage access commands are handled by the DMA controllers. In both cases, the memory operations are autonomous, and include a compare-and-swap capability.

FIG. 14 depicts a preferred layout of a processing element/cluster board. In terms of physical layout, a cluster preferably comprises a multilayer circuit board 1400 on which up to 64 processing element cards (i.e. circuit boards which each embody a processing element) are mounted directly, and at least one cluster controller thermal conduction module (TCM) 1402. Each cluster controller handles local message passing within the cluster, and connects to the switch network 606.

Figure 15:
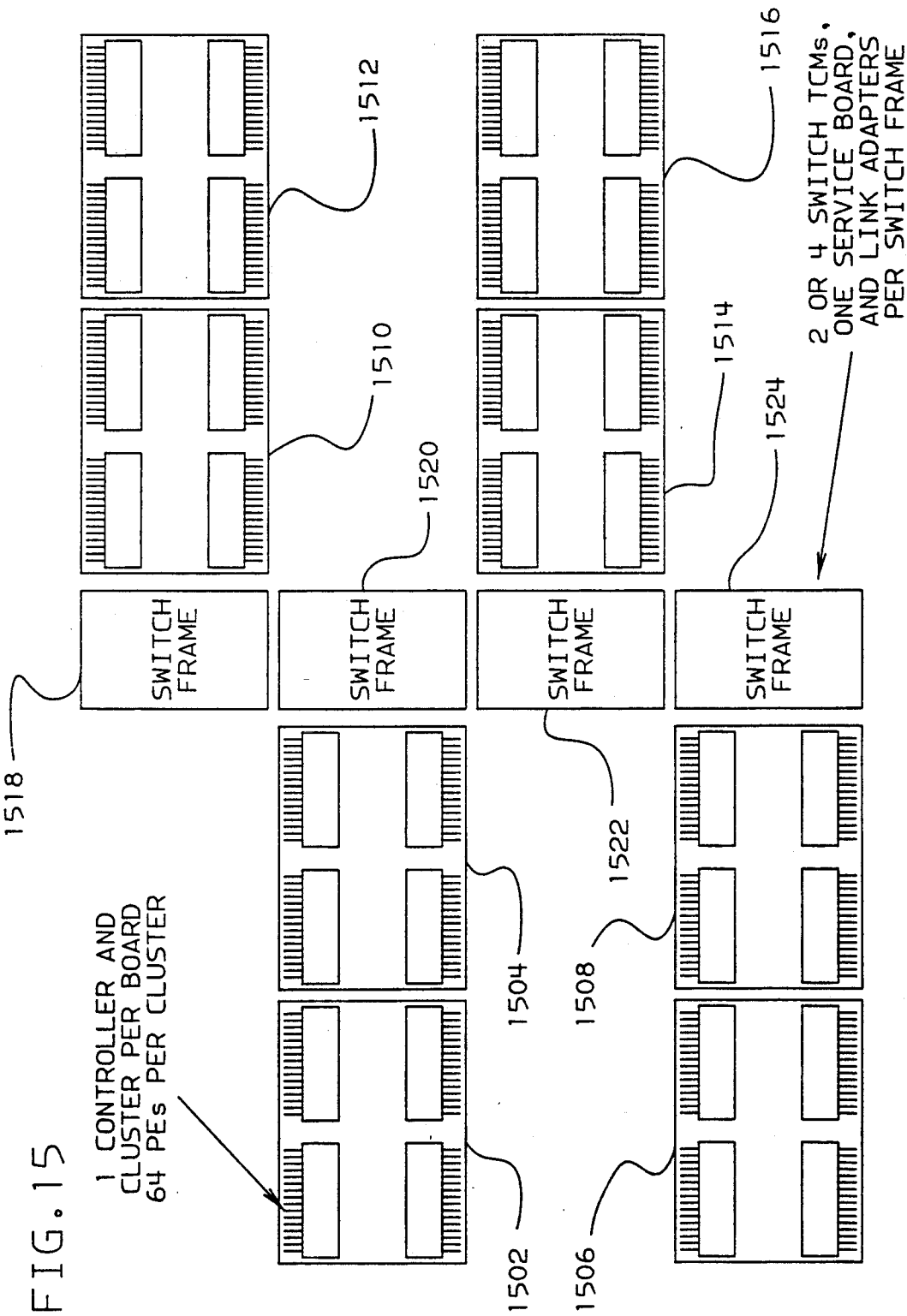
FIG. 15 is an illustration of a frame layout for the multiprocessing system of FIG. 6.

FIG. 15 shows a preferred system frame layout with four clusters in each of eight frames 1502-1516. The switch network thermal conduction modules are preferably embodied in central frames 1518-1524. The Host Adapter 1700 (FIG. 17) can reside in any one of the switch network frames 1502-1516. For availability and configurability reasons, an additional Host Adapter 1700 can be provided in another one of the switch network frames 1502-1516.

FIG. 16 shows a preferred layout for a processing element card 1600, including the high performance RISC microprocessor 1202, the optional database accelerator 1602, the DMA controller 1206, and the local memory 1210. The processing element cards 1600 have twice as many pins as can be connected to the cluster controller TCM. Therefore, a second set of PE buses (a second "PE port") is brought of the processing card and onto the mother board (the TCM mother board) where it is routed to the second (spare) cluster controller TCM position (1404, FIG. 14). This allows for future expansion: as CMOS densities continue to improve, a second PE could be packaged per card, and duplicate cluster controller and switch network TCM's could be plugged into the pre-wired boards, doubling the size of the system to 4096 PEs. Alternatively, with the optional cluster controller and switch network TCM's plugged, each PE could use two PE ports to the cluster controller, either for higher bandwidth or for improved fault tolerance.

The above-described system can be built as a stand-alone multiprocessing system, as a stand-alone database processor or employed as a coprocessor to a traditional mainframe host. In the latter case, the host system would provide the front-end MVS/DB2 system functions, including session management, transaction processing, database locking and recovery. The present multiprocessor system could also be employed as a back-end system to offload and accelerate the read-only complex query processing functions from the host.

Many modifications and variations which can be made without departing from the scope and spirit of the invention will now occur to those of skill in the art. It should be thus understood, that the present description of the system provided as an example and not as a limitation.

Having thus described our invention, what we claim as new and desire to secure by Letters Patent is:

1. A multiprocessing system having at least three nodes, comprising:
   a first node comprising means to transmit data, said data comprising a message body and destination identifying information indicative of a second node in said system;
   a third node coupled to said first node, said third node comprising means for receiving said data along a first path wherein said data has been misrouted to said third node due to an error in said destination identifying information occurring after transmission from said first node, said third node further comprising means for detecting and correcting said error in said destination identifying information so as to form corrected destination identifying information indicative of said second node and means for rerouting said data, along a second independent path, to said second node; and,
   a self routing switch, connected in common to said first node, said second node and said third node, said self routing switching comprising means for routing said data between said first node, said second node and said third node, responsive to said destination identifying information.

2. The multiprocessing system of claim 1 wherein said first, second and third nodes are processors and wherein said processors are each coupled to said self routing switch by way of independent input and output data paths.

3. The multiprocessing system of claim 2 wherein said data is packetized and comprises a destination field including said destination identifying information and a source field identifying a source processor.

4. The multiprocessing system of claim 3 wherein said switch comprises means for detecting when said destination field identifies a non-present processor, for reversing said source and destination fields and for rerouting all of said data to said source processor.

5. A multiprocessing system having provision for recovery from a hard error, comprising:
   a first processor comprising means to transmit packetized data, said data comprising a message body, a destination field comprising destination identifying information indicative of a second processor in said system, and a source field comprising source identifying information indicative of a source processor;
   a third processor coupled to said first processor by way of a first path, said third processor comprising means for receiving said data when said data has been misrouted to said third processor due to a hard error in said first path, said third processor further comprising means for correcting an error in said destination identifying information so as to form corrected destination identifying information indicative of said second processor and means for rerouting said data, along a second independent path, to said second processor; and,
   a self routing switch, said first second and third processors being connected in common to said self routing switch by way of independent input and output data paths,
   said self routing switch comprising means for detecting when said destination field identifies a non-present processor, for reversing said source and destination fields and for rerouting said packetized data to said source processor when said destination field identifying a non-present processor is detected.

6. A multiprocessing system having at least three nodes, comprising:
   a first node comprising means to transmit data, said data comprising a message body and destination identifying information indicative of a second node in said system;
   a third node coupled to said first node, said third node comprising means for receiving said data along a first path wherein said data has been misrouted to said third node due to a bit field error in said destination identifying information occurring after transmission from said first node,
   said third node further comprising means for detecting said error, means for applying an error correction code to said bit field so as to correct said error, and means for rerouting said data to said second node along a second independent path; and, p1 a self routing switch, connected in common to said first node, said second node and said third node, said self routing switch comprising means for routing said data between said first node, said second node and said third node, responsive to said destination identifying information.

7. The multiprocessing system of claim 6 wherein said first node, said second node and said third node are processors coupled to said self routing switch by way of independent input and output data paths.

8. The multiprocessing system of claim 7 further comprising a host computer coupled to said self routing switch.

9. The multiprocessing system of claim 7 wherein said host computer is coupled to said self routing switch by way of a fiber optic link.

10. The multiprocessing system of claim 8 wherein each of said processors comprises means for reporting to said host computer, errors detected in said destination identifying information.

11. The multiprocessing system of claim 8 wherein said data further comprises source bit field identifying a source processor and a destination bit field identifying a destination processor and wherein said self routing switch comprises: means for detecting when said destination bit field identifies a non-present processor, for reversing said source bit field and said destination bit field and for returning said message body to one of said processors identified by said source field when said destination field identifying a non-present processor is detected.

* * * * *